3,053,849
NEW PHTHALOCYANINE DYESTUFFS
Peter Frederick Clark and James Wardleworth, Manchester, England, assignors to Imperial Chemical Industries Limited, Millbank, London, England, a corporation of Great Britain
No Drawing. Filed Aug. 4, 1960, Ser. No. 47,392
Claims priority, application Great Britain Aug. 10, 1959
5 Claims. (Cl. 260—314.5)

This invention relates to new phthalocyanine dyestuffs and more particularly it relates to new water-soluble phthalocyanine dyestuffs which are valuable as reactive dyestuffs for cellulose textile materials.

We have found that novel and valuable reactive dyestuffs for cellulose may be obtained by condensing a phthalocyanine polysulphon chloride, that is to say, a phthalocyanine containing from 2 to 4 sulphonyl chloride groups, in part with an aliphatic primary amine which contains an alkoxy, alkylthio or alkylamino radical carrying a chlorine or bromine atom or a sulphate or sulphonic ester group in β-position to the O, S or N atom and in part with a secondary amine, a different primary amine or, preferably, ammonia, so choosing the starting materials and/or reaction conditions that the dyestuffs so obtained contain at least one sulphonic acid, sulphate ester or at most monosubstituted sulphamyl group.

These dyestuffs obtained in accordance with the invention may thus be represented by the formula:

(1)

wherein Pc represents a phthalocyanine radical, L represents a substituted amino radical of the formula:

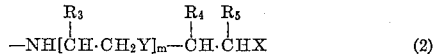

(2)

wherein $R_3$, $R_4$ and $R_5$ each represent a hydrogen atom or a lower alkyl group, Y represents —NH—, —N lower alkyl-, —O— or —S—, m represents 0 or 1 and X represents a chlorine or a bromine atom or a sulphato or sulphonyloxy group, M represents an amino or substituted amino radical differing from the substituted amino radical represented by L, a represents 0, 1 or 2.

b represents 1, 2 or 3.

c represents 1, 2 or 3, provided that when a is 0, at least one of the radicals represented by L and M contains a sulphonic acid or sulphate ester group, or M is an amino or monosubstituted amino radical and that the sum of a, b and c does not exceed 4.

Each of the sulphonic acid and the substituted or unsubstituted sulphonamido groups present in the new dyestuffs, as hereinbefore defined is directly attached to a carbon atom which is in the 4'- or, preferably, in the 3'-position of the benz rings of the phthalocyanine radical represented by Pc. The phthalocyanine radical Pc may be metal free but preferably it is a stable metal-containing phthalocyanine radical such as a cobalt phthalocyanine radical or a nickel phthalocyanine radical and above all a copper phthalocyanine radical.

The radical M may be represented by the formula:

(3)

wherein $R_1$ and $R_2$ each represent a hydrogen atom or a hydrocarbon or substituted hydrocarbon radical or together form with the nitrogen atom N a 5- or 6-membered heterocyclic ring. Preferably both represent hydrogen so that M represents an amino group.

The sulphonyloxy group represented by X may be the ester derived from any organic sulphonic acid, but preferably is a group of the formula $R.SO_2O$— where R represents a lower alkyl or an aryl, especially a monocyclic aryl radical.

Throughout this specification, the term lower alkyl means an alkyl radical of low molecular weight, such as one having from 1 to about 4 carbon atoms.

As examples of the hydrocarbon radicals or substituted hydrocarbon radicals represented by $R^1$ and $R^2$ there may be mentioned alkyl radicals such as methyl, ethyl, propyl and butyl, hydroxy alkyl radicals such as hydroxyethyl, β-γ-di-hydroxypropyl and γ-hydroxypropyl, cycloalkyl radicals such as cyclohexyl, aralkyl radicals such as benzyl, mono- and di-cyclic aryl radicals such as phenyl, tolyl and naphthyl, and substituted mono- and di-cyclic aryl radicals such as methoxyphenyl, carboxyphenyl and sulphophenyl.

As examples of the 5- or 6-membered heterocyclic rings which are formed by $R^1$, $R^2$ and the nitrogen atom N there may be mentioned morpholine, piperazine, piperidine and pyrrolidine.

As examples of the lower alkyl radicals represented by R, $R^3$, $R^4$ and $R^5$ there may be mentioned methyl, ethyl, propyl and butyl and as examples of the aryl radicals represented by R there may be mentioned phenyl and p-tolyl.

Preferably, the symbol L represents a 2-chloroethylamino radical.

According to a further feature of the invention there is provided a process for the manufacture of the new phthalocyanine dyestuffs, as hereinbefore defined, which comprises treating an aqueous suspension of a phthalocyanine sulphonchloride of the formula:

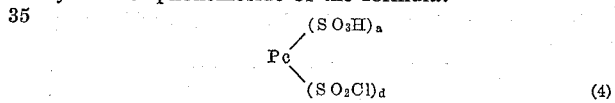

(4)

wherein Pc and a have the meanings stated above and d represents 2, 3 or 4 provided that a+d does not exceed 4, with a compound of the formula:

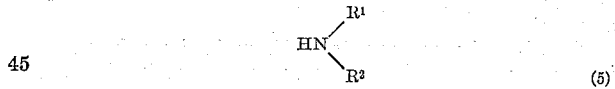

(5)

wherein $R^1$ and $R^2$ have the meanings stated above, and with a compound of the formula:

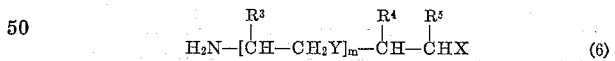

(6)

wherein $R^3$, $R^4$, $R^5$, X, Y and m have the meanings stated above, and when a is 0 optionally converting one or two of the sulphone chloride groups to a sulphonic acid group or groups.

The process of the invention may be conveniently brought about by adding the compound of Formula 5 or of Formula 6 or an aqueous solution thereof to the aqueous suspension of the phthalocyanine sulphonchloride, stirring the mixture, preferably at a temperature between 10° and 50° C. adding the other compound or an aqueous solution thereof, again stirring, preferably at a temperature of 10° to 50° C. to complete the reaction, whilst maintaining the pH of the mixture between 7 and 8 by the addition of an acid-binding agent, and, when starting from a phthalocyanine sulphonchloride which does not also contain a sulphonic acid group, optionally converting one or two of the sulphonchloride groups which have not been reacted with an amine to a sulphonic acid group by heating the mixture for a short time at a temperature between 50° C. and 60° C. whilst maintaining the pH between 7 and 8.

The hydrochloric acid which is liberated during the reaction is neutralised by adding an acid-binding agent such as sodium carbonate or alternatively an excess of the acid compounds of Formula 5 and/or 6 can be used.

The amounts of the compounds of Formula 5 and of Formula 6 used in the process of the invention will depend on the number of the two different sulphonamido groups which are required in the final product. When it is required to subsequently convert one or two of the sulphonchloride groups to sulphonic acid groups then the amount of the said compounds used will be insufficient to cause complete conversion of all the sulphonchloride groups to sulphonamido groups.

At the conclusion of the process the precipitated dyestuff is filtered off, if necessary after first adding sodium chloride or an acid such as hydrochloric acid and dried.

The products obtained in this manner are usually mixtures of the new phthalocyanine dyestuffs of the invention.

The fact that a mixture is obtained and not a single compound is not in any way deleterious to the use of the products as dyestuffs, and in many cases, a mixture of two dyestuffs has advantages over either of the two components of the mixture; in particular, it has been found advantageous to prepare mixtures which contain for each phthalocyanine nucleus, about 1.5 of the groups represented by L in the general formula, about 1.5 to 1 of the groups represented by M and about 1 to 1.5 sulphonic acid groups, the total number of sulphonic acid groups and groups represented by M being 2.5.

As examples of compounds of Formula 5 which may be used in the process of the invention there may be mentioned methylamine, ethylamine, taurine, β-hydroxyethylamine, β-aminopropionic acid, cyclohexylamine, benzylamine, aniline, orthanilic, metanilic, sulphanilic and anthranilic acids, m- and p-aminobenzoic acids, di-(β-hydroxyethyl)amine and N-methyl-N-β-hydroxyethylamine, but the preferred compound of Formula 5 is ammonia.

As examples of compounds of Formula 6 which may be used in the process of the invention there may be mentioned β-chloro-iso-butylamine, β-bromoethylamine, β-bromo-n-butylamine, β-bromo-n-propylamine, β-bromoisopropylamine, β-aminoethyl hydrogen sulphate, 2-(2'-aminoethylamino)ethyl chloride, 2-(2'-aminoethoxy)-ethyl chloride and 2-(2'-aminoethylthio)-ethyl chloride, but the preferred compound of Formula 6 is β-chloroethylamine.

If desired the compounds of Formula 6 can be used in the form of their salts with hydrogen chloride or hydrogen bromide.

The phthalocyanine sulphonchlorides used in the process of the invention may be obtained by treating the corresponding phthalocyanine or phthalocyanine sulphonic acid with chlorosulphonic acid, if necessary in the presence of carbon tetrachloride or an acid halide such as thionyl chloride, sulphurylchloride, phosphorus pentachloride, phosphorus oxychloride and phosphorus trichloride, for example as described in British specifications Nos. 708,543, 784,843 and 875,629 and in United States specification No. 2,219,330.

The new dyestuffs, as hereinbefore defined, wherein X represents an —OSO₃H or —OSO₂R group may also be obtained by using as the compound of Formula 6 a compound wherein X is —OH and subsequently treating the resulting phthalocyanine compound wherein X represents an —OH group, with, respectively, a sulphating agent such as chlorosulphonic acid or sulphur trioxide preferably in conjunction with a tertiary amine or an amide, or with a sulphonchloride of the formula R.SO₂Cl, wherein R has the meaning stated above.

The new dyestuffs, as hereinbefore defined, are valuable for colouring textile materials and in particular cellulose textile materials such as cotton, linen, and viscose rayon. The new dyestuffs are preferably applied to textile materials in conjunction with a treatment with an acid-binding agent, which may be applied to the textile materials before, during or after the application of the dyestuffs. As examples of acid-binding agents there may be mentioned sodium carbonate, sodium hydroxide, sodium metasilicate and trisodium phosphate or there may be used substances, such as sodium bicarbonate and sodium trichloroacetate, which on heating liberate an acid-binding agent.

The new dyestuffs, as hereinbefore defined may be applied to textile materials by a dyeing, padding or printing process. The aqueous solutions of the dyestuffs used for a dyeing or a padding process may contain any of the common dyebath adjuvants such as sodium chloride, sodium sulphate, sodium alginate, sodium dibenzylsulphanilate, urea and water-insoluble alkyl ethers of cellulose. When the dyestuffs are applied to the textile materials by a printing process then the print paste containing the dyestuff may contain any of the adjuvants which are normally added to print pastes such as urea, ethanol and sodium m-nitrobenzene sulphonate and thickening agents such as methyl cellulose, starch, locust bean gum, oil-in-water emulsions and water-in-oil emulsions but the preferred thickening agents for use with the new dyestuffs are alginates such as sodium alginate.

The new dyestuffs may also be used to colour natural proteins such as wool, silk and leather, and synthetic polyamides and polyacrylonitriles to give greenish-blue shades having a high fastness to washing by treating these materials in a weakly alkaline, neutral or acid solution of the dyestuff. It is preferred to carry out the dyeing of wool in the presence of a cationic surface-active agent such as stearamido-methyl pyridinium chloride, cetyl pyridinium bromide of cetyl trimethylammonium bromide, and preferably also in the presence of a non-ionic surface-active agent such as the polycondensation products of ethylene oxide with fatty alcohols, alkyl phenols and long chain alkylamines.

The new dyestuffs, as hereinbefore defined, when applied to textile materials give bright greenish-blue colourations which have excellent fastness to light and to wet treatments such as washing. The colourations obtained from the new dyestuffs are much stronger tinctorially than the colourations obtained from the corresponding dyestuffs which do not contain one or more

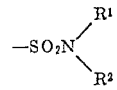

groups, as hereinbefore defined, they also have lower phototropism, higher fastness to light on materials which have been subjected to resin finishes, and lower sensitivity to pH changes.

The invention is illustrated but not limited by the following examples in which the parts and percentages are by weight:

*Example 1*

14.4 parts of copper phthalocyanine are dissolved in 75 parts of chlorosulphonic acid and the solution so obtained is stirred at a temperature between 135° and 140° C. for 4 hours. The solution is cooled to 20° C., then added, with stirring, to a mixture of ice and water, the temperature of the mixture being maintained below 2° C. by additions of ice. The precipitated sulphonchloride is then filtered off and washed with water at a temperature of 2° C.

The sulphonchloride so obtained is then stirred with a mixture of 125 parts of water and 75 parts of ice and 41.5 parts of a 20.4% aqueous solution of β-chloroethylamine hydrochloride are added. The pH of the mixture is adjusted to 7 by the addition of a 2 N aqueous solution of ammonium hydroxide and the temperature of the mixture is then gradually raised, during 1 hour, to 20° C. whilst maintaining the pH at 7 by further additions of the 2 N aqueous solution of ammonium hydroxide. The mixture is then stirred at a temperature between 20° and 25° C. until no further additions of the ammonium hydroxide solution are required to maintain the pH at 7. 100 parts of sodium chloride are then added and the precipitated dyestuff so obtained is filtered off, washed with a 25% aqueous solution of sodium chloride and dried at 35° C.

On analysis the dyestuff so obtained is found to contain 2β-chloroethylsulphamyl groups, 1 sulphonic acid group and 1 sulphamyl group per phthalocyanine nucleus.

When applied to cellulose textile materials by a printing process the dyestuff yields bright greenish-blue prints possessing excellent fastness to wet treatments and the prints so obtained are much stronger tinctorially than the prints obtained from the corresponding dyestuff which does not contain a sulphamyl group.

If in place of the 2 N aqueous solution of ammonium hydroxide used in the above example there is used a 2 N aqueous solution of monoethanolamine, a dyestuff having similar properties is obtained.

*Example 2*

115.2 parts of copper phthalocyanine are slowly added with stirring to 540 parts of chlorosulphonic acid and the mixture is then stirred for 3 hours at a temperature between 140° and 145° C. The mixture is cooled to 80° C., 100 parts of thionyl chloride are added and the mixture is then stirred for 2 hours at a temperature of 85° C. The mixture is cooled to 20° C., poured onto ice and the precipitated phthalocyanine sulphonchloride is filtered off and washed with 1000 parts of a 1% aqueous solution of hydrochloric acid which has been cooled to 0° C.

The paste of sulphonchloride so obtained is stirred with 1000 parts of water and 600 parts of ice and 170.4 parts of a 20.4% aqueous solution of β-chloroethylamine hydrochloride are then added. The pH of the resultant mixture is adjusted to 8 by the addition of a 2 N aqueous solution of ammonia hydroxide and the temperature of the mixture is then raised to 50° C. during 1 hour and maintained at 50° C. for 15 minutes, the pH of the mixture being maintained at 8 by further additions of a 2 N aqueous solution of ammonium hydroxide. The solution so obtained is cooled to 20° C. and is acidified to pH 3 by the addition of a concentrated aqueous solution of hydrochloric acid. The precipitated dyestuff is then filtered off, washed with a 1% aqueous solution of hydrochloric acid and dried at 50° C.

When applied to cellulose textile materials by a printing process the dyestuff yields bright greenish-blue prints possessing excellent fastness to wet treatments and the prints so obtained are much stronger tinctorially than the prints obtained from the corresponding dyestuff which does not contain a sulphamyl group.

It contains about 1.5 β-chloroethylsulphamyl, 1.2 sulphonic acid and 1.3 sulphamyl groups for each phthalocyanine nucleus.

A similar dyestuff is obtained if the thionyl chloride used in the manufacture of the copper phthalocyanine polysulphonchloride is replaced by 116 parts of phosphorus trichloride.

Dyestuffs having similar properties are also obtained by reacting a paste of copper phthalocyanine polysulphonchloride obtained as described in the first paragraph of the above example with 1.5 molecular proportions of the amine named in the first column of the following table and with an aqueous solution of the amine named in the second column of the following table, using the operating conditions described in the second paragraph of the example:

| | |
|---|---|
| (a) β-bromoethylamine | 3-amino-2-methylbutan-1-ol. |
| (b) 2-amino-1-chloropropane | 2,2'-dihydroxydiethylamine. |
| (c) 2-amino-2'-chlorodiethylamine | 3-aminopropan-1-ol. |
| (d) 2-amino-2'-chlorodiethylether | 3-aminopropan-1,2-diol. |
| (e) 2-amino-2'-chlorodiethylsulphide | N-methyl glucamine. |

*Example 3*

A paste of copper phthalocyanine polysulphonchloride obtained as described in the first paragraph of Example 2 is stirred with 1000 parts of water, 600 parts of ice and 18.3 parts of 2-hydroxyethylamine. The pH of the mixture is then adjusted to 8 by the addition of a 30% aqueous solution of piperidine, and the mixture is heated to 50° C. and stirred at this temperature adding further amounts of a 30% aqueous solution of piperidine to keep the pH at 8, until no further additions are necessary. The solution so obtained is cooled to 20° C. and is acidified to pH 3 by the addition of a concentrated aqueous solution of hydrochloric acid. The precipitated dyestuff is then filtered off, washed with a 1% aqueous solution of hydrochloric acid and dried at 50° C.

11.2 parts of this product are added to a mixture of 98 parts of pyridine and 18 parts of chlorosulphonic acid. The mixture is stirred at from 90 to 100° C. for 4 hours and is then poured into cold water. Potassium acetate is added until the dyestuff is precipitated and this precipitate is filtered off and washed with ethanol.

The sulphated product so obtained when applied to cellulose textile materials by dyeing or printing yields bright greenish-blue prints possessing excellent fastness to wet treatments and the colourations so obtained a much stronger tinctorially than the colouration obtained from the corresponding dyestuff which does not contain a piperidyl sulphamyl group.

*Example 4*

The procedure described in the first paragraph of Example 3 is repeated except that a 10% aqueous solution of methylamine is used in place of the aqueous solution of piperidine.

5 parts of the product so obtained are dissolved in 25 parts of dimethylformamide. 7.26 parts of dimethylaniline are added followed by 6.88 parts of methanesulphanyl chloride. The mixture is stirred and heated at 95° C. for 16 hours, then cooled and drowned into 200 parts of acetone. The precipitated product is filtered off, washed on the filter with acetone and dried. The copper phthalocyanine sulphonic acid sulphonmethylamide sulphone-β-(methane-sulphonyloxy)ethylamide so obtained when applied to cellulose textiles by printing yields bright greenish-blue prints possessing excellent fastness to wet treatments.

*Example 5*

240 parts of chlorosulphonic acid are stirred at 20° C. and 22.4 parts of copper phthalocyaninetetra-4'-sulphonic acid are added during 30 minutes. The mixture is stirred until solution is complete and is then heated to 115° C. and stirred for 4 hours. The mixture is then cooled to 20° C. and drowned into a mixture of ice and water. The precipitate formed is filtered, washed with a little ice-cold water and drained.

The paste of copper phthalocyanine polysulphonchloride so obtained is stirred with a mixture of 125 parts of water and 75 parts of ice and 41.5 parts of a 20.4% aqueous solution of β-chloroethylamine hydrochloride are added. The pH of the mixture is adjusted to 8 by the addition of a 25% aqueous solution of morpholine and the mixture is then warmed to 20° C. keeping the pH at 8 by further additions of the aqueous solution of morpholine. The mixture is then stirred at from 20 to 25° C. until no further addition of the amine is necessary to keep the pH at 8. Sodium chloride is then added and the precipitate is filtered off, washed with brine and dried.

The dyestuff so obtained is similar in its properties to that obtained in Example 1.

Dyestuffs having similar properties are also obtained by reacting a paste of copper phthalocyanine polysulphonchloride obtained as described in the first paragraph of the above example with 1.5 molecular proportions of the amine named in the first column of the following table and with an aqueous solution of the amine named in the second column of the following table, using the operating conditions described in the second paragraph of the example.

| | |
|---|---|
| (a) 2-amino-1-chloropropane | cyclohexylamine. |
| (b) 2-amino-2'-chlorodiethyl-sulphide | benzylamine. |
| (c) 2-amino-2'-chlorodiethylamine | aniline.[1] |
| (d) 2-bromoethylamine | taurine. |
| (e) 2-amino-2'-chlorodiethylether | metanilic acid.[1] |

[1] The reaction is preferably carried out at 50° C. at a pH of 7.

Example 6

A paste of copper phthalocyanine polysulphonchloride obtained as described in the first paragraph of Example 5 is stirred with 125 parts of water and 75 parts of ice and 2.8 parts of 2-amino-propan-1-ol. The pH of the mixture is adjusted to 8 by the addition of a 10% aqueous solution of dimethylamine and the mixture is heated to 40° C. and stirred at this temperature adding further amounts of dimethylamine to keep the pH at 8 until no further additions are necessary. The solution so obtained is cooled to 20° C. and is acidified to pH 3 by the addition of a concentrated aqueous solution of hydrochloric acid. The precipitated dyestuff is then filtered off, washed with a 1% aqueous solution of hydrochloric acid and dried at 50° C.

10 parts of the product so obtained are dissolved in 25 parts of dimethylformamide. 8.95 parts of diethylaniline and then 11.4 parts of p-toluenesulphonyl chloride are added. The mixture is stirred and heated at 95° C. for 16 hours, then cooled and drowned into 200 parts of acetone. The precipitated product is filtered off, washed on the filter with acetone and dried. The copper phthalocyanine sulphonic acid sulphondimethylamide sulphon-$\beta$-(p-toluenesulphonyloxy)isopropylamide so obtained dyes cellulose in bright greenish blue shades having excellent fastness to washing.

Example 7

163 parts of copper phthalocyanine-tri-4'-sulphonic acid are added with stirring to 540 parts of chlorosulphonic acid and the mixture is then stirred for 3 hours at a temperature between 140° and 145° C. The mixture is cooled to 80° C. 100 parts of thionyl chloride are added and the mixture is then stirred for 2 hours at a temperature of 85° C. The mixture is cooled to 20° C. poured onto ice and the precipitated phthalocyanine sulphonchloride is filtered off and washed with 1000 parts of a 1% aqueous solution of hydrochloric acid which has been cooled to 0° C.

The paste of sulphonchloride so obtained is stirred with 1000 parts of water and 600 parts of ice and 170.4 parts of a 20.4% aqueous solution of $\beta$-chloroethylamine hydrochloride are then added. The pH of the resultant mixture is adjusted to 8 by the addition of a 2 N aqueous solution of sodium hydroxide, then 78 parts of sodium orthanilate are added. The mixture is heated at 50° C. for 1 hour then acidified to pH 2–3 by the addition of a concentrated aqueous solution of hydrochloric acid. The precipitated dyestuff is filtered off, washed with a 1% aqueous solution of hydrochloric acid and dried at 50°.

The dyestuff so obtained is similar to those obtained in Example 2.

Dyestuffs having similar properties are also obtained by reacting a paste of copper phthalocyanine polysulphonchloride obtained as described in the first paragraph of the above example with 1.5 molecular proportions of the amine named in the first column of the following table and with an excess of the amine named in the second column of the following table, using the operating conditions described in the second paragraph of the example:

| | |
|---|---|
| (a) 2-amino-2'-chlorodiethylamine | $\beta$-aminopropionic acid. |
| (b) 2-amino-1-chloropropane | sulphanilic acid. |
| (c) 2-bromoethylamine | anthranilic acid. |
| (d) 2-amino-2'-chlorodiethylsulphide | m-aminobenzoic acid. |
| (e) 2-amino-2'-chlorodiethyl ether | 2-hydroxyethylamine. |

Example 8

A paste of copper phthalocyanine polysulphonchloride obtained as described in the first paragraph of Example 7 is stirred with 1000 parts of water, 600 parts of ice and 18.3 parts of 2-hydroxyethylamine. The pH of the mixture is then adjusted to 8 by the addition of 20% aqueous ethylamine solution and the mixture is heated to 50° C. and stirred at this temperature, adding further amounts of the ethylamine solution to keep the pH at 8 until no further additions are necessary. The solution so obtained is cooled to 20° C. and is acidified to pH 3 by the addition of a concentrated aqueous solution of hydrochloric acid. The precipitated dyestuff is then filtered off, washed with a 1% aqueous solution of hydrochloric acid and dried at 50° C.

10 parts of the product so obtained are dissolved in 25 parts of dimethylformamide. 8.95 parts of diethylaniline and then 7.72 parts of ethanesulphonyl chloride are added. The mixture is stirred and heated at 95° C. for 16 hours, then cooled and drowned into 200 parts of acetone. The precipitated product is filtered off, washed on the filter with acetone and dried. The copper phthalocyanine sulphonic acid sulphonethylamide sulphon-$\beta$-(ethanesulphonyloxy)ethylamide so obtained dyes cellulose in bright greenish-blue shades having excellent fastness to washing.

Example 9

If the copper phthalocyanine used in Example 1 is replaced by nickel phthalocyanine, a dyestuff is obtained which gives slightly duller and greener shades, but which otherwise has the same general dyeing and printing properties.

What we claim is:

1. A compound of the formula:

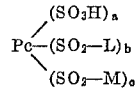

wherein Pc represents a phthalocyanine selected from the class consisting of cobalt, nickel, and copper phthalocyanine, L represents a substituted amino radical of the formula:

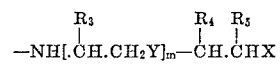

wherein $R_3$, $R_4$, and $R_5$ each independently represents a radical selected from the class consisting of hydrogen and lower alkyl, Y represents a radical selected from the class consisting of —NH—, —N lower alkyl-, —O—, and —S—, $m$ represents one of the numbers 0 and 1, X represents a member of the group consisting of chlorine and bromine atoms and sulphato and sulphonyloxy groups, M represents an amino radical of the formula:

wherein $R_1$ and $R_2$ are independently selected from the group consisting of hydrogen, lower alkyl, hydroxy lower alkyl, cyclohexyl, benzyl, tolyl, phenyl, naphthyl, methoxyphenyl, sulfophenyl, carboxy phenyl, methoxynaphthyl, sulfonnaphthyl and carboxynaphthyl, and together $R_1$ and $R_2$ represent with the nitrogen atom N a heterocyclic ring selected from the group consisting of morpholine, piperazine, piperidine and pyrollidine; $a$ represents one of the numbers 0, 1, and 2, $b$ and $c$ represents one of the numbers 1, 2, and 3, provided that the sum of $a$, $b$, and $c$ has a value of from 2 to 4 inclusive provided the compound has at least one solubilizing group selected from the group consisting of sulfato and sulfonic acid groups provided by the preceding definitions of $a$, L and M.

2. Mixtures of the compounds of claim 1 in which the mixture has the combined average values of about 1 to 1.5 for $a$ and about 1.5 for $b$, about 1.5 to 1 for $c$ and $a+c=$about 2.5, per phthalocyanine radical.

3. The phthalocyanine dyestuffs according to claim 1 wherein the symbol Pc represents a copper phthalocyanine radical.

4. The phthalocyanine dyestuffs according to claim 1 wherein the symbol M represents an unsubstituted amino group.

5. The phthalocyanine dyestuffs according to claim 1 wherein the symbol L represents the β-chloroethylamino radical.

References Cited in the file of this patent

UNITED STATES PATENTS

| | | |
|---|---|---|
| 2,072,062 | Wolfram et al. | Feb. 23, 1937 |
| 2,350,188 | Pinkney | May 30, 1944 |
| 2,761,868 | Lacey | Sept. 4, 1956 |
| 2,772,284 | Barnhart et al. | Nov. 27, 1956 |

OTHER REFERENCES

Colour Index, 2nd ed., 1956, Society of Dyers and Colourists, vol. 2, page 2201, entry C.I. 74180.

Ibid, vol. 3, page 3570, entry C.I. 74180.